United States Patent [19]
Vogeley et al.

[11] Patent Number: 5,235,363
[45] Date of Patent: Aug. 10, 1993

[54] METHOD AND APPARATUS FOR INTERACTING WITH A COMPUTER GENERATED PROJECTED IMAGE

[75] Inventors: James H. Vogeley; Arthur W. Vogeley, both of Yorktown, Va.

[73] Assignee: nView Corporation, Newport News, Va.

[21] Appl. No.: 698,091

[22] Filed: May 10, 1991

[51] Int. Cl.$^5$ .................. G03B 21/00; G09G 3/02
[52] U.S. Cl. .................... 353/122; 353/42; 340/706
[58] Field of Search ............ 353/29, 42, 122, 121, 353/46, 48; 340/706, 707

[56] References Cited

U.S. PATENT DOCUMENTS

| | | | |
|---|---|---|---|
| 2,986,596 | 5/1961 | Hammond, Jr. | 178/5.6 |
| 3,801,741 | 4/1974 | Ablett | 178/6.8 |
| 3,885,096 | 5/1975 | Inuiya | 178/15 |
| 3,917,955 | 11/1975 | Inuiya | 340/707 |
| 3,936,596 | 2/1976 | Inuiya | 178/6 |
| 4,209,255 | 6/1980 | Heynau et al. | 340/707 |
| 4,368,963 | 1/1983 | Stolov | 353/31 |
| 4,384,338 | 5/1983 | Bennett | 364/522 |
| 4,503,468 | 3/1985 | Serinken et al. | 358/256 |
| 4,565,999 | 1/1986 | King et al. | 340/707 |
| 4,591,841 | 5/1986 | Gunderson et al. | 340/707 |
| 4,654,517 | 3/1987 | Reed | 250/201 |
| 4,675,665 | 6/1987 | Halliwell | 340/707 |
| 4,679,909 | 7/1987 | Hamada et al. | |
| 4,730,218 | 3/1988 | Goodrich | 358/185 |
| 4,730,928 | 3/1988 | Gabriel et al. | 356/373 |
| 4,808,980 | 2/1989 | Drumm | 340/707 |
| 4,844,476 | 7/1989 | Becker | 340/707 |
| 4,846,694 | 7/1989 | Erhardt | 434/365 |
| 4,953,971 | 9/1990 | Highfill | 353/122 |
| 5,114,224 | 5/1992 | Miyamoto et al. | 353/122 |

OTHER PUBLICATIONS

Operating Principle of Position-Sensing Diode (PSD), pp. 3-7, Nov. 20, 1990.

Primary Examiner—William A. Cuchlinski, Jr.
Assistant Examiner—William C. Dowling
Attorney, Agent, or Firm—Nixon & Vanderhye

[57] ABSTRACT

Disclosed is a method and apparatus for one or more operators to interact with a computer-controlled image projection system. An operator-controlled radiation projector projects a beam of radiation which may be visible or invisible on the image created by the computer-controlled image projection system. A position sensing device determines the position of the projected radiation relative to the projected image and provides position information to the computer. In a preferred embodiment, the computer can then generate an additional image at or related to the spot of radiation permitting the operator to draw or paint pictures on the computer-projected image.

39 Claims, 3 Drawing Sheets

METHOD AND APPARATUS FOR INTERACTING WITH A COMPUTER GENERATED PROJECTED IMAGE

BACKGROUND AND SUMMARY OF THE INVENTION

1. Field of the Invention

The present invention relates generally to computer-controlled image projectors and specifically to interaction between an operator and the computer-controlled image being projected.

2. Discussion of Prior Art

A wide variety of devices have been produced for permitting an operator to manually interact with a computer and imagery produced therefrom. Such devices includes the "mouse", a "track ball", a joystick, a touch screen and an electronic chalkboard.

The "mouse" is a device in which a ball is rolled over a surface and the amount of roll is sensed and governs the incremental movement of a computer generated position indicator, such as a cursor on the screen from an initial point on the image to some desired destination point. In order to accommodate slippage or sticking between the ball and the surface, there is generally no fixed relationship between the orientation of the ball and any image point. Efficient operation requires a certain amount of practice and/or training by the operator.

Similarly, the "track ball" is mounted for rotation in a fixed position and the ball is rotated by the operator's hand or fingers with the same general effect as the mouse, i.e. movement of a computer-generated position indicator.

A joystick, as in an airplane control device, is a control stick that can be tilted in two axes. Although the tilt angle may be directly related to the image location, precision of the operation is difficult to achieve. Alternatively, in some embodiments, the tilt angle is used to establish the rate of movement with the tilt direction indicative of the direction of movement of the cursor. Efficient operation of such a device is definitely. a learned operation.

A light pen device is utilized with a raster-scanned cathode ray tube (CRT) wherein a light detector at the tip of the pen senses passage of the CRT electron beam, making it possible to time-relate beam passage to pen-/image location. Pointing accuracy or resolution is affected by the distance between the light pen and the phosphor layer and is degraded by faceplate thickness, glare filters, etc. While such a device is useable with projected CRT imagery, it is not useable with non-scanned and/or matrix-addressed imagery (three color projection systems, LCD projection systems, etc.).

Touch screen systems utilize a stylus which is brought into close proximity to the screen image and the location of the stylus is sensed by means of its interaction with a reference field established over the image and generated optically, magnetically, inductively or otherwise. The "reference field" requirement makes it necessary to fix the image size and ease of operation and resolution cannot be improved by enlargement of the image.

The electronic chalkboard is a device like a blackboard or a writing tablet which can be written upon and the writing can be sensed in some fashion as with a touch screen for later storage and printout. Unlike a touch screen, erasure and correction becomes somewhat complicated. Like a touch screen, cost and complexity tend to be strongly affected by image size.

The difficulty with all of the above devices is that they are generally cable connected to a computer. Although cordless versions of some are available, implementation of this feature is relatively costly and complex.

Additional difficulties with the above (except perhaps the electronic chalkboard) are that their use is not intuitive, requiring the learning and practice of unfamiliar manual techniques. Precise and tedious operation is generally required in order to operate down to the resolution of most imagery.

SUMMARY OF THE INVENTION

It is therefore an object of the present invention to permit manual interaction with a computer-generated image.

It is a further object to permit such operation, regardless of whether it is front-projected or rear-projected imagery.

It is a further object of the present invention to be able to operate without constraint on image size.

It is a still further object of the present invention to interact with a computer without a physical, mechanical, magnetic, or optical connection or other interaction with the computer projection equipment, except for a cordless (IR or RF) data link.

It is an additional object of the present invention to permit intuitive operation, rather than requiring a learned activity, with respect to interaction with a computer generated image.

It is also a further object to have the cost and compactness of the present invention essentially fixed and independent of image size.

The above and other objects are achieved by providing an operator-controlled radiation projector capable of projecting controlled radiation onto either a front or rear projection screen to which the computer-controlled image projection system supplies an image. A position sensor is utilized in conjunction with the computer-controlled image projector system to determine the position of the operator-controlled radiation and provide an output to the computer indicative of such position information. This feedback to the computer allows the computer to interact with the operator and, in a preferred embodiment, allows the computer to "paint" a visible image on the screen at the location of the projected radiation or at least at a position related thereto.

BRIEF DESCRIPTION OF THE DRAWINGS

The present invention will be more easily understood and appreciated by reference to the attached drawings, wherein.

DETAILED DESCRIPTION OF THE DRAWINGS

The following discussion is with respect to the Figures and similar reference numerals are utilized in the Figures to indicate similar elements.

Figure 1:
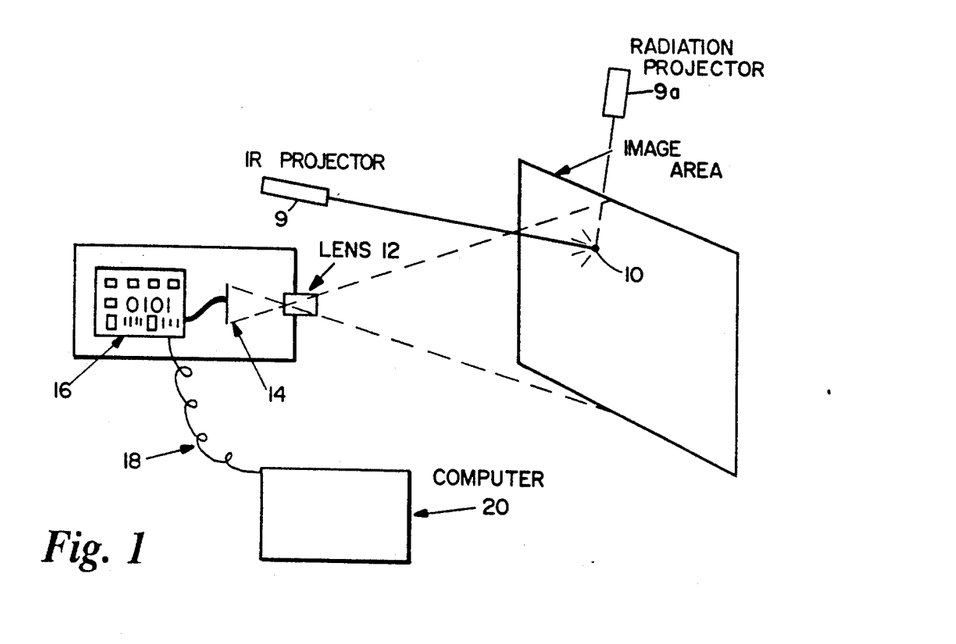
FIG. 1 is a block diagram illustrating the elements of a position sensing means in accordance with one aspect of the present invention.

FIG. 1 illustrates the principle upon which the operator-controlled radiation position is sensed. In the embodiment, an operator-controlled radiation projector 9 transmits infra-red radiation which impinges on the image area at spot 10. If the image area is a front-projection screen, the infra-red radiation is reflected off of the screen. If the image area is a back-projection screen, the operator-controlled radiation projector could be on the other side of the screen and provides a refractive/scattered radiation from spot 10. While a reflective system would have to have the radiation projector on the same side of the screen as the image projection system, a back projection system could have the radiation projector on the same or opposite side from the computer-controlled image projection system (since some of the radiation projector will be reflected and some will be refracted through the screen and in either instance it could be sensed) as shown in FIG. 1 by alternative radiation projector 9a.

Reflected or refracted radiation from radiation spot 10 (and it is noted that the spot could certainly be of any geometric shape or shapes or indeed any image that was desirable) is focussed through lens 12 onto sensor means 14 which may be any form of photosensor capable of outputting a signal for processing and interpretation to define the radiation position on the focussed image area. The sensor means 14 may either be analog (area diode, vidicon tube, etc.) or digital (charge coupled diode (CCD), area or linear) in nature.

One preferred embodiment of the present invention, which is illustrated is the position sensing diode which will be discussed in detail with respect to FIGS. 3 through 7 elsewhere.

Regardless of the actual device utilized as the position sensor, a signal containing position information is provided to the electronics which provides, through data link 18, position information to computer 20. The existence or non-existence of operator-controlled radiation at an appropriate position on the image area could comprise an operator controlled input to the computer accomplishing the desired result of the broad aspect of the present invention.

For example, should the computer program have a multiple choice question displayed in the image area with boxes next to the alternate answers, the operator being questioned could merely point a radiation projector at the particular box indicative of his or her answer choice. If the position sensing means indicates radiation from the image area at that position, the computer would register the indicated answer as the subject's answer for that question and go on to the next question. Thus, in its most simplified form, the device acts as a position sensor and permits interaction with a computer program which displays an image on the image area.

Of course, when the computer utilizes the position information to generate a corresponding image at or in some relation to the spot 10, then it is possible for the operator to utilize the current system to "write", "paint" or otherwise affect the image and interact with the computer, perhaps in the fashion of a computer-aided design, computer-aided machining (CAD/CAM) system.

Figure 2:
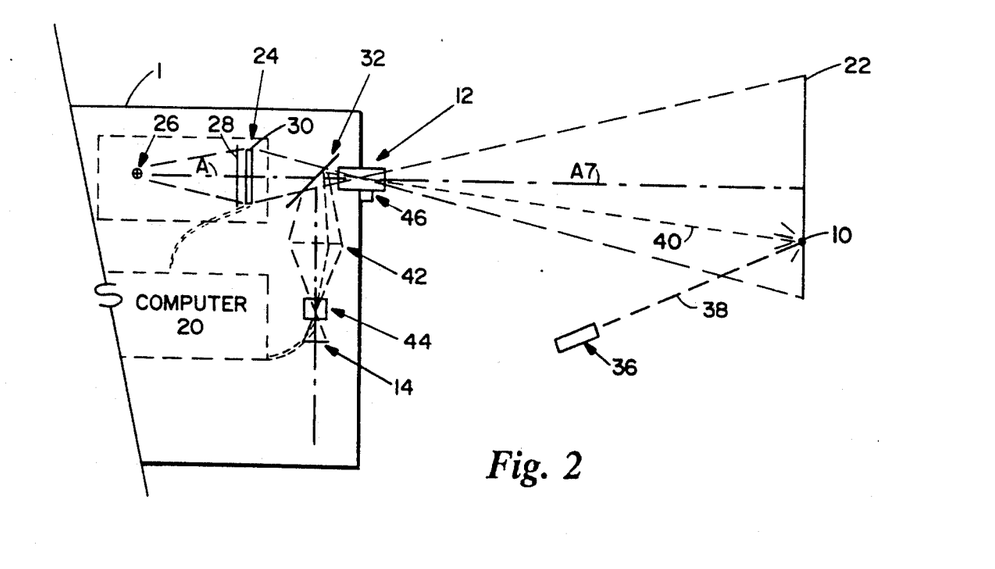
FIG. 2 is a schematic view illustrating the elements and operation of the present invention.

Such a system embodiment is illustrated in FIG. 2. Image surface 22 is illuminated by a computer-controlled image projection system which in turn is controlled by computer 20. In the illustrated embodiment, the computer-controlled image projection system comprises an illumination source 26, a lens 28 and a liquid crystal display (LCD) panel for generating a computer-controlled image along optical axis A. An example of such an LCD system is disclosed in U.S. Pat. No. 4,763,993 issued to Vogeley on Aug. 16, 1988 (herein incorporated by reference).

With such LCD systems, black and white, as well as color, images can be front or back-projected onto suitable screens for viewing. The image from LCD 30 passes through beamsplitting mirror 32 through projection lens 12 and is projected upon the image surface 22 along a projection light optical path.

An operator-controlled radiation projector 36 supplies a beam of radiation 38 which contacts image surface 22 at spot 10 (in one embodiment a laser light beam). Beam 38 is at least partially reflected (in the case of a front projection system) or refracted (in the case of a rear projection screen) with a portion of the radiation travelling along a reflected light optical path which can be at least partially coincident with the original image beam path from the computer-controlled image projector system, said path indicated as dotted line 40. It should be remembered that the radiation travelling along path 40 can be visible or invisible to the operator.

The radiation travels through projection lens 12 and is reflected by beamsplitter mirror 32 through return image lens 42 through image reduction lens 44 to sensor means 14 where the position of radiation spot 10 is provided to computer 20.

Conveniently, the above components, with the exception of the operator-controlled radiation projector and the image surface 22, can be conveniently mounted in housing 1 as shown. Not shown are the other components which may also be advantageously incorporated into housing 1, such as additional lenses or cooling systems for the projector illumination source 26, the sensor means 14 as well as LCD 30, and other control systems for computer 20, including power supplies, etc.

It should be noted that the computer-controlled image projection systems, such as in the illustrated embodiment including one or more liquid crystal panels, are reasonably well known. In a preferred embodiment of the liquid crystal panel embodiment, one or more liquid crystals are associated with one or more polarizers, filters, etc. required for generating monochromatic or color images. The LCD panels may be "passive" or "active" matrix type panels where such "active" type panels are also known as thin film transistor (TFT) LCD panels. The panels may be made of any type of material (twisted nematic, supertwisted nematic, ferroelectric, electrophoretic, etc.) or other materials not yet known, which are suitable for projection. Alternatively, instead of utilizing LCD panels, the system may comprise a projection CRT system such as those currently in use with large screen projection television systems. Lens 12 can be any variety of projection optics suitable for focussing and forming an image from the computer-controlled image projection system onto the image surface 22.

It is further noted that the sensor means is located in the vicinity of the optical axis of radiation deflected by beamsplitter mirror 32. Obviously, dependent upon the angle of the beamsplitter mirror, the position of sensor means 14 will change if it is to be supplied with an image from image surface 22. The benefit of locating sensor means 14 on the optical axis A, as reflected by beamsplitter mirror 32, is to take maximum advantage of the Optical Law of Reciprocity. This law states, essentially that object and image are interchangeable, resulting in a number of non-obvious benefits to the present arrangement which will be enumerated below.

In addition to the obvious benefits of compactness, cost, etc. by utilizing the same optic path for the projected image, the reflected operator-controlled system on the same optical axis is as follows. According to the Optical Law, the image formed on image surface 22 will be reflected back along the optical axis in exactly the same size and shape as originally transmitted. The beamsplitter mirror allows the sensor means to be positioned optically at the same position as the object (formed by the computer-controlled image projector system 24 and located at LCD 30). However, this would require a sensor means of essentially the same size as the LCD and such a large sensor means is not necessary.

In a preferred embodiment, use can be made of a generally smaller and relatively inexpensive charge coupled diode (CCD) type sensor, such as those found in portable video cameras or a relatively small position sensing diode (PSD), which will be subsequently discussed in detail. In order to reduce the radiation returning along return path 40 to a size compatible with the sensor means, an image reduction lens 44 is utilized.

It is also noted that the beamsplitter functions to divide the optical path as noted above. Where in most cases the optical image projected by the image projection system 24 is in the visible light range, it is possible that the radiation transmitted by the operator controlled radiation projector and reflected or refracted from the image surface along return path 40 may be invisible infra-red radiation. The beamsplitter will serve to separate the visible from the infra-red perhaps permitting only the infra-red to be reflected through the return image lens and the image reduction lens to the sensor means 14. The beamsplitter mirror could be comprised of a dichroic mirror, pellicle, a "cold" mirror or other equivalent device.

The benefits accrued by utilizing the Optical Reciprocity Law are as follows:

(1) Focussing the LCD object onto image surface 22 automatically focuses the return image of radiation spot 10 along return path 40 onto the sensor means;

(2) Any optical distortions (pincushion, barrel, etc.) to the projected image produced by the projection lens are automatically cancelled and eliminated in the image return to the sensor means;

(3) Any viewing distortions (keystoning, etc.) produced by non-optimum alignment of the image surface 22 with the optical axis "A" are also eliminated at the sensor means;

(4) Placing both the object (LCD) and image (sensor) on a single optical axis avoids parallax effects and thereby eliminates the need for performing any coordinate conversions to relate the sensor image position information to the actual position of radiation spot 10.

Quite clearly, the positions of the projector and sensor elements and their respective lenses could be reversed or otherwise modified depending upon the desired physical arrangement. Appropriate adjustments and/or changes to the beamsplitter mirror 32, as well as the inclusion of additional mirrors and/or lenses would be appropriate. It is also clear, that although there are advantages to utilizing a single projection lens and a single optical axis, dual lenses (mounted closely together, parallel and coupled to operate in unison) and dual optical axes could be used. Such an arrangement eliminates the requirement of a beamsplitter but requires that suitable visible and IR light filters be provided so as to distinguish between perceived light. Such a configuration preserves the benefits of the reciprocity law, except for the introduction of a small amount of parallax which can be accommodated by suitable corrections in the computer software as relates to the position information from the image sensor.

The operator-controlled radiation projector 36 can comprise a number of different forms which provide great flexibility in operation. While the most common form of the radiation projector 36 would be a device similar to a writing implement or pointer in which the beam 38 is directed towards image surface 22 from a distance, the device could also be utilized in close or direct contact with the viewing surface. While the radiation could be visible at a single frequency (as in a laser source) with the position sensor tuned to that frequency, it could also be pulse code modulated so as to differentiate it from other visible radiation. In a preferred embodiment, the radiation is infrared so that it is not visably detectable by the operator of the system.

The projector in one embodiment could include a visible light beam which is not sensed by the position sending device and another beam whose position is sensed, where the sensed beam can be turned on and off by the operator. This allows the operator to designate portions of the projected image (when the sensed beam is off) and then interact with the computer and change the projected image by "writing", "painting", "erasing", etc. (when the sensed beam is on). As previously noted, while radiation spot 10 is shown as being a point or small dot of light, it could be any desired symbol or symbols including a circle, a rectangle, etc. In the dual beam embodiment discussed, the visible beam could be a circle with the invisible beam covering the circle with the computer programmed to erase any image covered by the invisible beam. The computer could also be limited so as to erase only images previously added by the "writing" or "painting" by the operator on the image.

For front-projection embodiments, the IR light in a preferred embodiment would be transmitted directly toward the sensor, or, alternatively, directed toward the image surface and then reflected back to the sensor. In such an embodiment, the image surface 22 could be coated with a material which emits a different type of radiation when illuminated with a first type of radiation. Examples of such materials are florescent materials which give off visible light when illuminated by ultraviolet light.

In any event, the light, visible or otherwise, from radiation spot 10 should spread sufficiently such that a portion of the light is directed along return path 40 so as to be sensed by sensor means 14. Conversely for a rear-projection embodiment, the visible or the operator-controlled radiation would be directed by the operator towards the imaging surface where it would pass through the surface and, after spreading somewhat, be detected on the other side.

The operator-controlled radiation projector 36 could have a number of additional features which render the device extremely utilitarian. Unlike the touch screen and other prior art devices, which are limited to well defined and generally small areas and which, incidentally, generally require a cable connection between the image surface and the computer-controlled image projection system, the present operator-controlled radiation projector 36 could quite easily be cordless for its mobility attributes. Cordless operation is readily provided by internal battery power of the radiation generator of the beam 38.

Because commands such as off/on, start/stop, color selection, etc. are generally transmitted through the connecting cable of prior art devices, the preferred cordless form of the operator-controlled radiation projector 36 utilizes further unique and novel aspects. The device would include a variable frequency oscillator for turning the IR illumination on or off.

The projector 36 can transmit in a number of discrete fixed and selectable frequencies determined by any one of a number of electronic means where a separate frequency or pulse code is provided equal in number to the number of separate commands desired. The commands and appropriate frequencies are selected by suitable actuators (buttons, switches, etc.) controlled by the operator. Such information on frequency, pulse code, etc. generated by the operator-controlled radiation projector 36 is sensed by frequency detector 46 and control information can be provided directly to computer 20.

Figure 3:
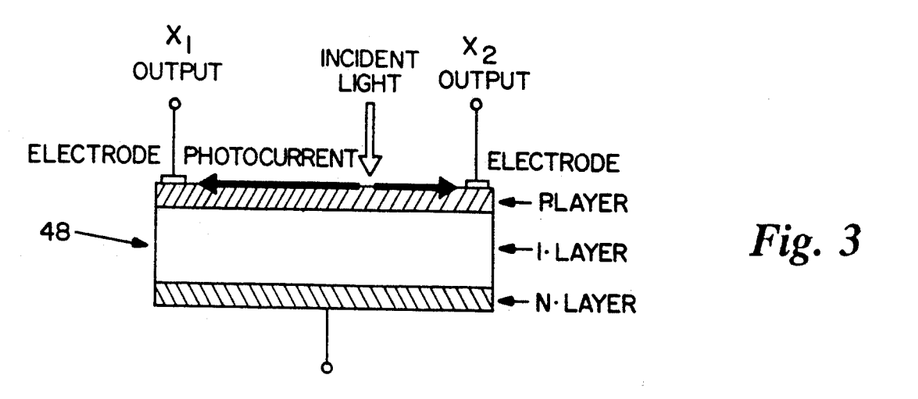
FIG. 3 is a cross-sectional view of a position sensing diode utilized in one embodiment of the present invention.
Figure 4:
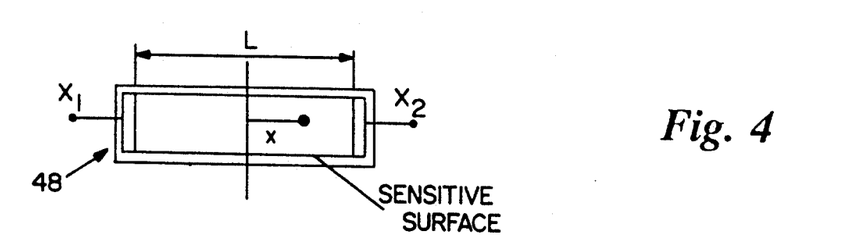
FIG. 4 is a top view of a one dimensional position sensing diode.
Figure 5:
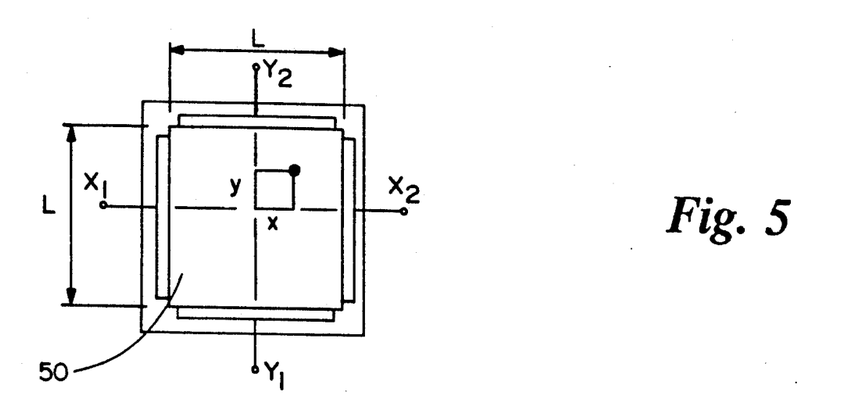
FIG. 5 is a top view of a two dimensional position sensing diode.

A preferred embodiment of the sensor means 14 is a position sensing diode (PSD) which is illustrated in FIGS. 3 through 5. In FIG. 3, there is shown a typical PSD consisting of a P layer, an I layer and an N layer. When a light spot falls on the sensitive surface of a PSD, an electric charge proportional to the light energy is generated at the incident position. The charge is driven through the resistive P layer and collected by the electrodes. Since the resistivity of the P layer is uniform, the photocurrent collected by an electrode is inversely proportional to the distance between the incident position and the electrodes. Therefore, the difference between the electrode currents at the respective two outputs when divided by the sum of the currents provides an indication of the position of the light incident thereon.

FIG. 4 is a top view of the PSD shown in FIG. 3 which in fact would comprise a one-dimensional PSD system. It is obvious that if the incident light spot were on the center line (immediately below "L"), equal current would go to both electrodes and the difference current would be zero. The following formula provides the indication of the incident spot a distance x from the center line position as shown:

$$\frac{X_2 - X_1}{X_1 + X_2} = \frac{2X}{L}$$

Where $X_1$ is the current at electrode $X_1$, $X_2$ is the current at $X_2$, and L is the distance between the two electrodes.

FIG. 5 illustrates a two-dimensional PSD in a square arrangement and the above formula still applies with respect to the distance x from the center array along the horizontal axis. The following formula provides the distance Y in a vertical direction from the center of the array:

$$\frac{Y_2 - Y_1}{Y_1 + Y_2} = \frac{2Y}{L}$$

Where $Y_1$ is the current at electrode $Y_1$ and $Y_2$ is the current at electrode $Y_2$.

Position sensing diodes have typical position detection errors of 0.1% or 1 part per one thousand. This accuracy level is more than sufficient for use with present LCD panels having a resolution of 640×480 pixels. Importantly, the response time of a PSD is fast enough for use of the PSD with frequencies as high as 35 Kilohertz. As we shall see, this high frequency response provides a number of benefits when the PSD is utilized as the preferred sensor means.

For example, the operator-controlled radiation projector 36 can output a visible light in the form of square waves at frequencies (for command functions) up to 35 Kilohertz. Since the light from the computer-controlled image projector system 24 fluctuates at frame rate frequencies on the order of 100 Hertz or less, discrimination between the two sources of light can be made on the basis of frequency. Narrow band filters, tunable to the various operator-controlled radiation projector frequencies (when used as command signals) would easily separate operator-control signals from the image return. In such an embodiment, the operator-controlled radiation projector would be a light emitting diode (LED) or laser diode in order to operate at frequencies in the Kilohertz range.

An added benefit of using such sources is that pulsing permits operation at light outputs considerably higher than the values allowed under steady state operation (given a constant power requirement). A benefit of using a visible radiation spot 10 (as opposed to non-visible IR or UV) is that it provides immediate feedback to the operator utilizing the projector, especially when it is being used as a pointer. In a preferred embodiment, digital filters, as opposed to analog filters could be used. These filters may be of a number of different configurations and have advantages over analog filters as follows:

They are stable with little or no drift with time and/or temperature. They are repeatable in that the component values are replaced by digital parameters. They are adaptable such that parameters are programmable and reconfigureable. Digital filters require digitized input values. The resolution of the A/D converters depends upon the requirements with respect to the visible image. For example, for use with an LCD based computer-controlled image projection system 24 where the LCD has 640×480 pixel resolution, a ten-bit converter is required to achieve greater than one part in 640 accuracy.

Figure 6:
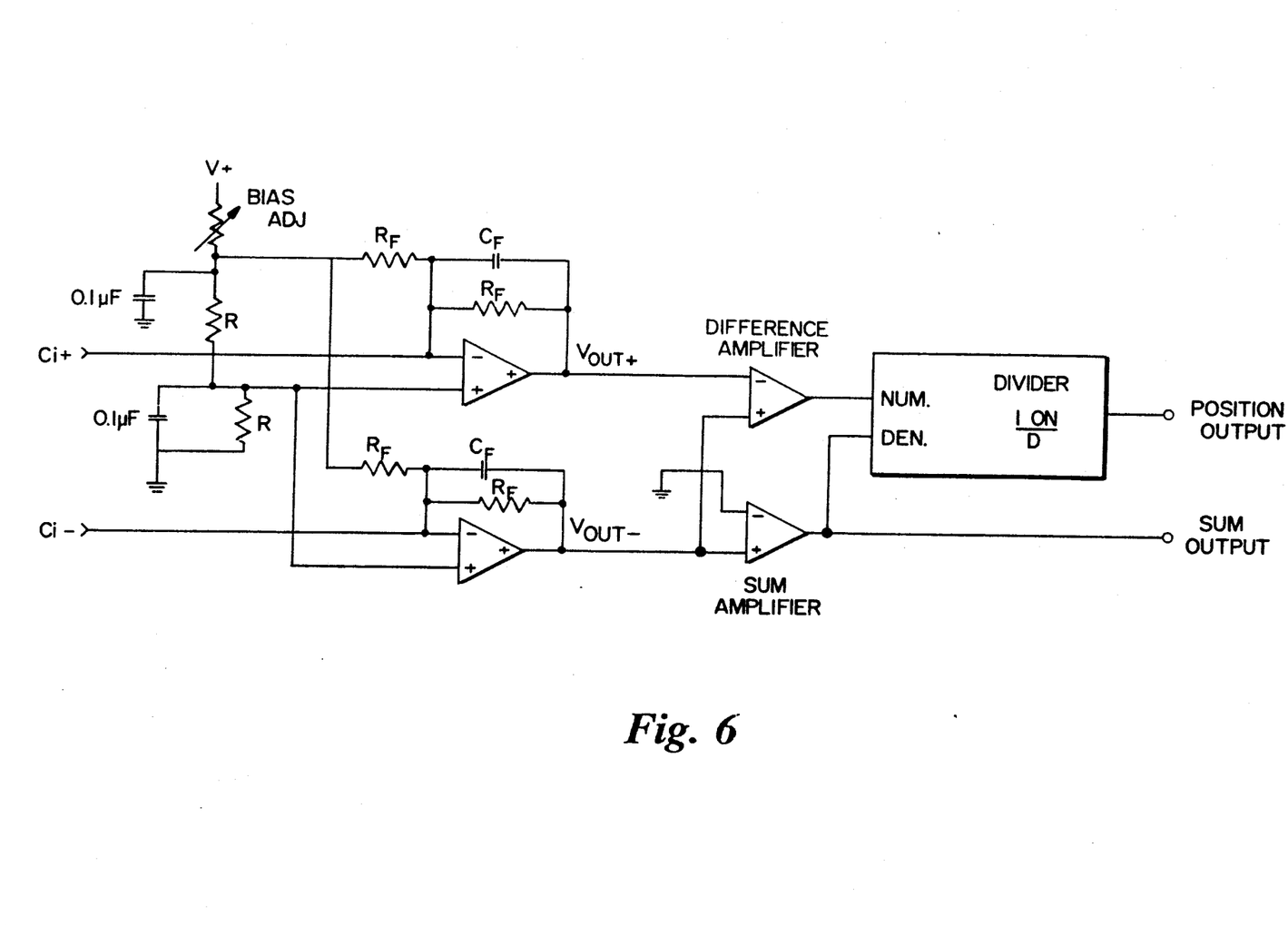
FIG. 6 is an electrical schematic diagram of a circuit for processing the output of a position sensing diode.

Reference to FIG. 6 may be had which shows one preferred circuit for position calculations with respect to a PSD. A combination of operational amplifiers performs the sum and difference calculations followed by a division circuit to provide the output position information as per the above formulas. A similar circuit could be utilized for both vertical and horizontal position information. Although the FIG. 6 circuit operates in an analog fashion, it could be followed by analog-to-digital converters feeding into digital filters as discussed above wherein the information is further processed by computer 20. Where appropriate, the computer itself could be utilized to process the above information or a separate embedded microprocessor could be dedicated to this system. In either instance, the computer system utilized would include the A/D converter control, digital filtering, frequency shifting to match the operator-controlled radiation projector frequencies, calibration, etc.

Operation of such a device using the position sensing diode would be similar to that previously discussed with respect to a charge coupled diode or other light responsive element. However, the use of a visible light, instead of IR or some other invisible radiation, makes it possible to completely automate and rapidly carry out the calibration procedure that could accommodate the use of separate non-coaxial, unmatched and relatively inexpensive sensor optics. Such calibration procedure would, of course, accommodate optics distortion such as keystoning and other types of distortion.

Additionally, such implementation lends the present system applicable as a stand-alone unit accessory to existing LCD or CRT projection systems. One calibration procedure would be as follows:

(1) The LCD or CRT projector would be programmed to present a dark background image.

(2) In rapid sequence, a number of single, bright points of light at known locations on the image would be programmed to cover (in grid form) the projected image.

(3) The system would measure the positions on the sensor of these points of light and enter them into a lookup table.

(4) In use then, the sensor position of the operator-controlled radiation projector would be compared to the lookup table values and interpolated to provide the accurate, corresponding projected image location automatically corrected for keystoning, distortion, etc.

Even though visible light is being utilized, the frequency difference between the frequency of operation of the image projection system and the frequency operation of the operator-controlled radiation projector would clearly avoid confusion between the two signals. The benefit is that the filtering system can pass very low levels of the desired frequency while rejecting relatively high levels of the undesired frequency.

The signal to noise ratio can further be enhanced if the operator-controlled radiation projector as previously noted, uses pulse code modulation and transmits a specific code and the position sensing diode looks for this coded pulse and then provides an output with respect to the modulation code.

Therefore, the benefits of the position sensing diode's high frequency response can be effectively utilized to insure a high signal-to-noise ratio of visible light projected from the radiation projector without having it so bright that it takes away or distracts from the image provided by computer-controlled image projector system.

In view of the above, a number of benefits of the present invention can be seen. Regardless of the projection distance, the sensor means can accurately determine the position of radiation spot 10 and provide this information to the computer. The information can be utilized to indicate an operator response to a computer generated question, or can be used to create a spot projected by the computer-controlled image projection system coincident with the radiation spot which remains on the image when the radiation spot 10 is moved or removed. A series of dots or other symbols can be projected and remain in place. In fact, it is exceedingly easy to write, draw and otherwise actively include and record movements of radiation spot 10 on the image by merely storing the radiation spot position and having the computer-controlled image projector generate a corresponding spot, line or other graphical image at that point.

Obviously, different colors could be generated by the computer-controlled image projector system in response to the position sensing of a radiation spot 10. However, the removal of colors or other computer generated imagery could also be accomplished with the radiation spot. For example, the radiation projector could be used as an eraser and, if it were given a geometric shape, movement of the radiation shape over a portion of the image area could cause the computer-controlled image projector system to also move and delete particular colors or images which are encountered by the radiation spot during movement.

Quite clearly and, dependent upon the desired objects, the device could be programmed to allow multiple operators to use multiple image projection systems, each one operating at a different frequency or pulse code modulation and allowing each different operator to "paint" on the image surface. Similarly, one or more projection systems could also be used to "erase" one or more of images "painted" on the image surface or portions of the image originally generated through the image projection system.

In view of the above, there are particular advantages in utilizing the present invention in conjunction with a computer-generated projected imagery (developing, modifying, annotating, etc.) during group computing sessions. The apparatus could also be used for recording material which is being electronically written on a conventional writing surface (blackboard, whiteboard, flip charts, etc.) in classrooms or lectures for later printout and distribution.

Psycho-physiological testing with direct recording and immediate analysis of the results could also be accomplished with the present device. Additionally, there is a distinct potential for game playing using pointing devices which comprise the operator-controlled radiation projector. Training by simulation in tasks such as aerial combat, jungle warfare, target detection, target practice, etc. could also be accomplished. Further, bulletin board, directory, schedule, route selection, etc. information call-up (from general to detailed) by pointing for use in transportation terminals, department-/catalog stores, museums, restaurants, etc. would also be highly advantageous. A further embodiment could also be advantageously used with respect to group critiquing and editing of large and/or complex computer-generated printouts.

Therefore, and in view of the above description, those of ordinary skill in the art will appreciate there are many varied applications of the present invention as well as a plurality of embodiments depending upon the ultimate application. Accordingly, the present invention is not limited by way of the above discussion with respect to preferred embodiments and examples, but rather is limited only by the scope of the claims appended hereto.

What is claimed is:

1. An apparatus enabling an operator to interact with a computer, said apparatus comprising:
   an image projection system, responsive to said computer, for projecting an image on an image surface;
   a radiation projector, controlled by said operator, for providing at least one radiation spot adjacent said image surface, where position of said spot relative to said image is controlled by said operator; and position sensing means, responsive to reflected radiation from said radiation spot on said image surface, for providing radiation spot position information with respect to said image to said computer.

2. The apparatus of claim 1 wherein said computer and said image projection system comprise a means for generating a visible image at a position related to the position of said radiation spot.

3. The apparatus according to claim 1 in which said radiation projector projects radiation in the invisible frequency spectrum.

4. The apparatus according to claim 1 in which said radiation projector projects radiation in the visible range.

5. The apparatus according to claim 1 wherein said image surface comprises a reflective screen.

6. The apparatus according to claim 1 wherein said image surface comprises a back projection screen.

7. The apparatus according to claim 1 wherein said position sensing means comprises a position sensing diode having position outputs and means, responsive to said position sensing diode position outputs, for calculating said position information therefrom and providing said position information to said computer.

8. The apparatus according to claim 1, wherein said radiation spot is located on said image surface.

9. The apparatus according to claim 1, wherein said radiation projector includes a means for providing an operator selectable code modulated radiation spot and said position sensing means includes means, responsive to said code modulated radiation spot, for providing an operator command to said computer.

10. The apparatus according to claim 9, wherein said code modulated radiation spot includes a pulse code modulated radiation spot.

11. The apparatus according to claim 9, wherein said code modulated radiation spot includes a frequency modulated radiation spot.

12. An apparatus enabling an operator to interact with a computer, said apparatus comprising:
a liquid crystal display image projection system, responsive to said computer, for projecting an image on an image surface, said projection system comprising:
a projection light source;
a liquid crystal display panel, responsive to said computer and located along a projection optical axis from said light source, for generating images;
lens means, along said optical path, for projecting said images on said image surface;
a handheld radiation projector, controlled by said operator, for providing at least one radiation spot adjacent said image surface, where position of said spot relative to said image is controlled by said operator; and
position sensing means, responsive to the position of said radiation spot on said image surface, for providing radiation spot position information with respect to said image to said computer, said position sensing means comprising:
position sensing diode means for providing an output to said computer indicative of said position of said radiation on said image surface;
means for focussing light returned from said image surface along a returned light optical axis and onto said position sensing diode, said returned light including said radiation.

13. The apparatus according to claim 12, wherein said projection system lens means comprises:
a projection lens for focussing and projecting said image along said projection light optical axis and onto said image surface; and
a lens for focussing said images from said liquid crystal display along said projection light optical axis upon said projection lens.

14. The apparatus according to claim 12 wherein said reflected light optical axis and said projection light optical axis are at least partially coincident.

15. The apparatus according to claim 12 wherein said handheld radiation projector comprises means for generating a laser beam and said laser beam comprises visible radiation.

16. The apparatus according to claim 12 wherein said handheld radiation projector comprises means for generating an infrared beam and said infrared beam comprises said radiation.

17. A method of interacting with a projected computer-controlled visible image comprising the steps of:
providing at least one spot of radiation adjacent said projected image under the control of an operator, where position of said spot relative to said image is controlled by said operator;
sensing the position of said beam relative to said image; and
providing said sensed position information of said beam relative to said image to said computer.

18. The method of claim 17 wherein said step of projecting a computer-controlled image includes the step of projecting said image along a projection optical path, said sensing step includes the step of focussing an image of said beam on said projected image on a position sensing means.

19. The method of claim 18 wherein said focussing step includes focussing said beam image along a reflected light optical path which is at least partially coincident with said projected light optical path.

20. The method of claim 17 further including the step of controllably generating an image of said beam at said sensed position on said projected image.

21. The method of claim 17 further including the step of controllably changing at least a portion of said image of said beam at said sensed position on said projected image.

22. The method of claim 17 wherein said projecting step includes the step of projecting a laser beam onto said projected image, and said sensing step includes sensing the position of the laser beam on said projected image.

23. The method of claim 17 wherein said projecting step includes the step of projecting an infrared beam onto said projected image, and said sensing step includes sensing the position of the infrared beam on said projected image.

24. The method of claim 17 wherein said projecting step includes the step of projecting a pulse code modulated beam onto said projected image, and aid sensing step includes sensing the position of the pulse code modulated beam on said projected image.

25. The method according to claim 17, wherein said radiation spot is located on said image.

26. The method according to claim 17, wherein said providing step includes providing an operator selectable code modulated radiation spot and said sensing step, responsive to said code modulated radiation spot, includes the step of providing an operator command to said computer.

27. The method according to claim 26, wherein said code modulated radiation spot includes a pulse code modulated radiation spot.

28. The method according to claim 26, wherein said code modulated radiation spot includes a frequency modulated radiation spot.

29. An apparatus enabling an operator to interact with a computer, said apparatus comprising:
   an image projection system, responsive to said computer, for projecting an image on an image surface;
   a radiation projector, controlled by said operator, for providing at least one radiation spot adjacent said image surface, where position of said spot relative to said image is controlled by said operator; and
   position sensing means, responsive to refracted radiation from said radiation spot on said image surface, for providing radiation spot position information with respect to said image to said computer.

30. The apparatus of claim 29 wherein said computer and said image projection system comprise a means for generating a visible image at a position related to the position of said radiation spot.

31. The apparatus according to claim 29 in which said radiation projector projects radiation in the invisible frequency spectrum.

32. The apparatus according to claim 29 in which said radiation projector projects radiation in the visible range.

33. The apparatus according to claim 29 wherein said image surface comprises a reflective screen.

34. The apparatus according to claim 29 wherein said image surface comprises a back projection screen.

35. The apparatus according to claim 29 wherein said position sensing means comprises a position sensing diode having position outputs and means, responsive to said position sensing diode position outputs, for calculating said position information therefrom and providing said position information to said computer.

36. The apparatus according to claim 29, wherein said radiation spot is located on said image surface.

37. The apparatus according to claim 29, wherein said radiation projector includes a means for providing an operator selectable code modulated radiation spot and said position sensing means includes means, responsive to said code modulated radiation spot, for providing an operator command to said computer.

38. The apparatus according to claim 37 wherein said code modulated radiation spot includes a pulse code modulated radiation spot.

39. The apparatus according to claim 37, wherein said code modulated radiation spot includes a frequency modulated radiation spot.

* * * * *